W. C. MARSHALL.
TREATING AND DRYING ANIMAL MATTER.
No. 7,742. Reissued June 12, 1877.
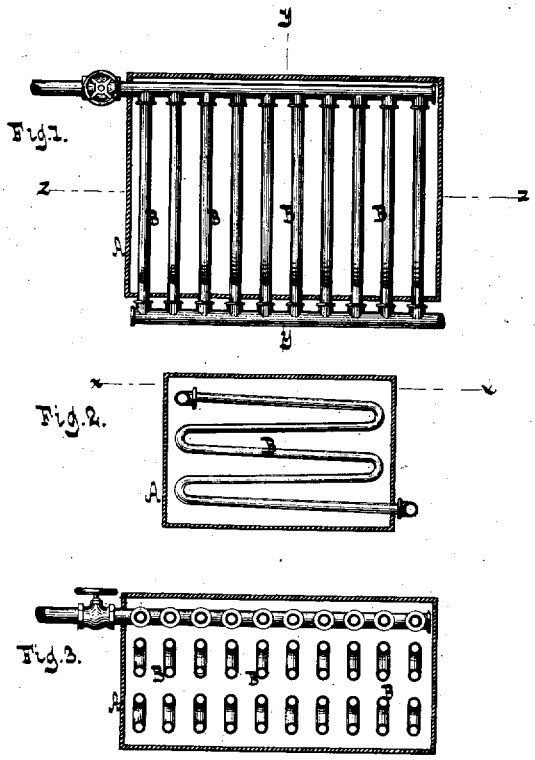
Witnesses
Otto Schupland
Chas. Wahlers.
Inventor.
William C. Marshall.
by
Van Santvoord & Hauff
his attorneys.

UNITED STATES PATENT OFFICE.

WILLIAM C. MARSHALL, OF NEW YORK, N. Y.

IMPROVEMENT IN TREATING AND DRYING ANIMAL MATTER.

Specification forming part of Letters Patent No. 137,699, dated April 8, 1873; reissue No. 7,712, dated June 12, 1877; application filed May 31, 1877.

*To all whom it may concern:*

Be it known that I, WILLIAM C. MARSHALL, of the city, county, and State of New York, have invented a new and useful Improvement in Process and Apparatus for Treating and Drying Animal Matter, which improvement is fully set forth in the following specification, reference being had to the accompanying drawing, in which—

Figure 1 represents a horizontal section of the apparatus which I use in carrying out my invention, the line *x x* indicating the plane of section. Fig. 2 is a transverse section of the same in the plane *y y*, Fig. 1. Fig. 3 is a longitudinal vertical section of the same in the plane *z z*, Fig. 1.

Similar letters indicate corresponding parts.

My invention consists in exposing the animal matter which is to be dried to the action of heating-coils placed side by side at suitable distances apart, in a chamber which can be closed, so that, by spreading the animal matter on the surface of the coils and closing the chamber, said animal matter gradually dries and drops down between the coils, whence it is finally removed in a dry state, ready to be handled and to be packed for the market.

In the drawing, the letter A designates a chamber made of sheet metal, or of wood lined with sheet metal, and provided with a cover, by means of which it can be firmly closed. In this chamber are placed a series of heating-coils, B, which are set at uniform distances apart, as shown in the drawing, the distance between each pair of coils being about five inches. Said coils are heated by steam or hot air supplied from a suitable reservoir by one or more pipes, as may be desirable, each of which may have a separate connection with the reservoir, or which may be connected to each other, and supplied with steam or hot air by one and the same pipe.

The animal matter to be dried is shoveled on the surface of the heating-coils, and as the same begins to dry it drops down between the coils, when more animal matter is introduced until the chamber is filled. By closing the chamber the animal matter is exposed to the full heat radiating from the coils, and it dries rapidly to such a degree that the same, on being removed from the chamber, can be conveniently handled and packed ready for the market. The animal matter thus prepared can be used as fertilizer or for other purposes.

I have applied my invention with advantage for drying scrap of lard as the same is taken from the lard-presses, but it can be employed also for drying blood, fish, or other animal matter. It must also be remarked that by closing the chamber A obnoxious odors are avoided.

What I claim as new, and desire to secure by Letters Patent, is—

1. The within-described process of treating animal matter by exposing the same to the action of heating-coils arranged in a closed chamber, substantially in the manner herein set forth.

2. The combination of a series of heating-coils, B, at suitable distances apart, with a closed chamber, A, substantially in the manner and for the purpose herein shown and described.

In testimony that I claim the foregoing I have hereunto set my hand and seal this 29th day of May, 1877.

W. C. MARSHALL. [L. S.]

Witnesses:

W. HAUFF,

E. F. KASTENHUBER.